(12) United States Patent
Liu

(10) Patent No.: US 9,337,115 B2
(45) Date of Patent: May 10, 2016

(54) CHIP PACKAGE AND METHOD FOR FORMING THE SAME

(71) Applicant: XINTEC INC., Taoyuan (TW)

(72) Inventor: Chien-Hung Liu, New Taipei (TW)

(73) Assignee: XINTEC INC., Taoyuan (TW)

( * ) Notice: Subject to any disclaimer, the term of this patent is extended or adjusted under 35 U.S.C. 154(b) by 0 days.

(21) Appl. No.: 14/676,671

(22) Filed: Apr. 1, 2015

(65) Prior Publication Data
US 2015/0287659 A1 Oct. 8, 2015

(30) Foreign Application Priority Data

Apr. 2, 2014 (TW) .............................. 103112268 A
Aug. 19, 2014 (TW) .............................. 103128390 A

(51) Int. Cl.
| | |
|---|---|
| H01L 23/31 | (2006.01) |
| H01L 23/498 | (2006.01) |
| H01L 21/48 | (2006.01) |
| H01L 21/02 | (2006.01) |
| H01L 21/56 | (2006.01) |
| G01K 1/00 | (2006.01) |
| G06F 21/32 | (2013.01) |
| G06K 9/00 | (2006.01) |
| G01L 19/06 | (2006.01) |
| G01L 19/14 | (2006.01) |
| H01L 21/60 | (2006.01) |
| H01L 23/525 | (2006.01) |

(52) U.S. Cl.
CPC .............. *H01L 23/3114* (2013.01); *G01K 1/00* (2013.01); *G01L 19/0627* (2013.01); *G01L 19/14* (2013.01); *G06F 21/32* (2013.01); *G06K 9/00* (2013.01); *H01L 21/0212* (2013.01); *H01L 21/02263* (2013.01); *H01L 21/56* (2013.01); *H01L 23/3185* (2013.01); *H01L 23/3192* (2013.01); *H01L 23/525* (2013.01); *H01L 2021/60022* (2013.01); *H01L 2224/11* (2013.01)

(58) Field of Classification Search
CPC ............ H01L 23/3114; H01L 23/3171; H01L 23/3185; H01L 23/3192; H01L 21/02263; H01L 21/0212
USPC .................................. 257/734–738, 431–448
See application file for complete search history.

(56) References Cited

U.S. PATENT DOCUMENTS 9,177,919 B2 * 11/2015 Liu ..................... H01L 23/5386

* cited by examiner

*Primary Examiner* — Cuong Q Nguyen
(74) *Attorney, Agent, or Firm* — Liu & Liu

(57) ABSTRACT

A chip package is provided. The chip package includes a substrate having a first surface and a second surface opposite thereto. The substrate includes a sensing device and a conducting pad therein. The sensing device and the conducting pad are adjacent to the first surface. The conducting pad has a sidewall laterally protruding from a sidewall of the substrate. An encapsulation layer is attached to the first surface of the substrate to cover the sensing device and the conducting pad. A redistribution layer is disposed on the second surface of the substrate and extends to contact the sidewall of the conducting pad. An end of the redistribution layer protrudes from the first surface of the substrate and is level with a third surface of the encapsulation layer that is opposite to the first surface. A method of forming the chip package is also provided.

24 Claims, 6 Drawing Sheets

CHIP PACKAGE AND METHOD FOR FORMING THE SAME

CROSS REFERENCE TO RELATED APPLICATIONS

This application is based on, and claims priority of Taiwan Patent Application No. 103112268, filed on Apr. 2, 2014, and priority of Taiwan Patent Application No. 103128390, filed on Aug. 19, 2014, the entirety of which is incorporated by reference herein.

BACKGROUND OF THE INVENTION

1. Field of the Invention

The invention relates to chip packaging technology, and in particular to a chip package and methods for forming the same.

2. Description of the Related Art

The chip packaging process is an important step in the fabrication of an electronic product. Chip packages not only protect the chips therein from outer environmental contaminants, but they also provide electrical connection paths between electronic elements inside and those outside of the chip packages.

When an electronic product with touch-screen function is used by the users, vapor or oil tends to remain on the electronic product. The sensing device of the chip package in the electronic product is contaminated and physically damaged when the users use the electronic product, thereby reducing the reliability and lifetime of the electronic product.

Thus, there exists a need in the art for development of a chip package and methods for forming the same capable of mitigating or eliminating the aforementioned problems.

BRIEF SUMMARY OF THE INVENTION

An embodiment of the invention provides a chip package comprising a substrate having a first surface and a second surface opposite thereto. The substrate comprises a sensing device and at least one conducting pad therein, and the sensing device and the conducting pad are adjacent to the first surface. The conducting pad has a sidewall laterally protruding from a sidewall of the substrate. An encapsulation layer is attached to the first surface of the substrate to cover the sensing device and the conducting pad. A redistribution layer is disposed on the second surface of the substrate and extends to contact the sidewall of the conducting pad. An end of the redistribution layer protrudes from the first surface of the substrate and is aligned with a third surface of the encapsulation layer that is opposite to the first surface of the substrate.

An embodiment of the invention provides a method for forming a chip package comprising providing a substrate. The substrate has a first surface and a second surface opposite thereto. The substrate comprises a sensing device and at least one conducting pad therein, and the sensing device and the conducting pad are adjacent to the first surface. The conducting pad has a sidewall laterally protruding from a sidewall of the substrate. An encapsulation layer is attached to the first surface of the substrate to cover the sensing device and the conducting pad. A redistribution layer is formed on the second surface of the substrate. The redistribution layer extends to contact the sidewall of the conducting pad. An end of the redistribution layer protrudes from the first surface of the substrate and is aligned with a third surface of the encapsulation layer that is opposite to the first surface of the substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the present disclosure are discussed in detail below. However, it should be noted that the embodiments provide many applicable inventive concepts that can be embodied in a variety of specific methods. The specific embodiments discussed are merely illustrative of specific methods to make and use the embodiments, and do not limit the scope of the disclosure. The disclosed contents of the present disclosure include all the embodiments derived from claims of the present disclosure by those skilled in the art. In addition, the present disclosure may repeat reference numbers and/or letters in the various embodiments. This repetition is for the purpose of simplicity and clarity, and does not imply any relationship between the different embodiments and/or configurations discussed. Furthermore, when a first layer is referred to as being on or overlying a second layer, the first layer may be in direct contact with the second layer, or spaced apart from the second layer by one or more material layers.

A chip package according to an embodiment of the present invention may be used to package micro-electro-mechanical system chips. However, embodiments of the invention are not limited thereto. For example, the chip package of the embodiments of the invention may be implemented to package active or passive elements or electronic components of integrated circuits, such as digital or analog circuits. For example, the chip package may be related to optoelectronic devices, micro-electro-mechanical systems (MEMS), biometric devices, microfluidic systems, and physical sensors measuring changes to physical quantities such as heat, light, capacitance, pressure, and so on. In particular, a wafer-level packaging (WSP) process may optionally be used to package semiconductor chips, such as image-sensor elements, light-emitting diodes (LEDs), solar cells, RF circuits, accelerators, gyroscopes, fingerprint recognition devices, micro actuators, surface acoustic wave devices, pressure sensors, ink printer heads, and so on.

The above-mentioned wafer-level packaging process mainly means that after the packaging step is accomplished during the wafer stage, the wafer with chips is cut to obtain individual packages. However, in a specific embodiment, separated semiconductor chips may be redistributed on a carrier wafer and then packaged, which may also be referred to as a wafer-level packaging process. In addition, the above-mentioned wafer-level packaging process may also be adapted to form a chip package having multi-layer integrated circuit devices by stacking a plurality of wafers having integrated circuits.

Figure 1A:
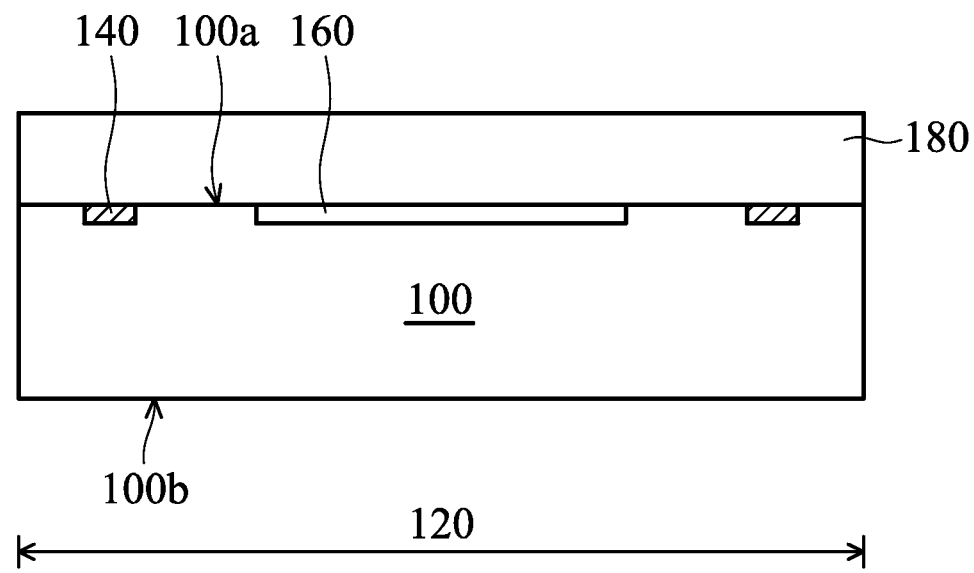
FIGS. 1A to 1G are cross-sectional views of an exemplary embodiment of a method for forming a chip package according to the invention.
Figure 1B:
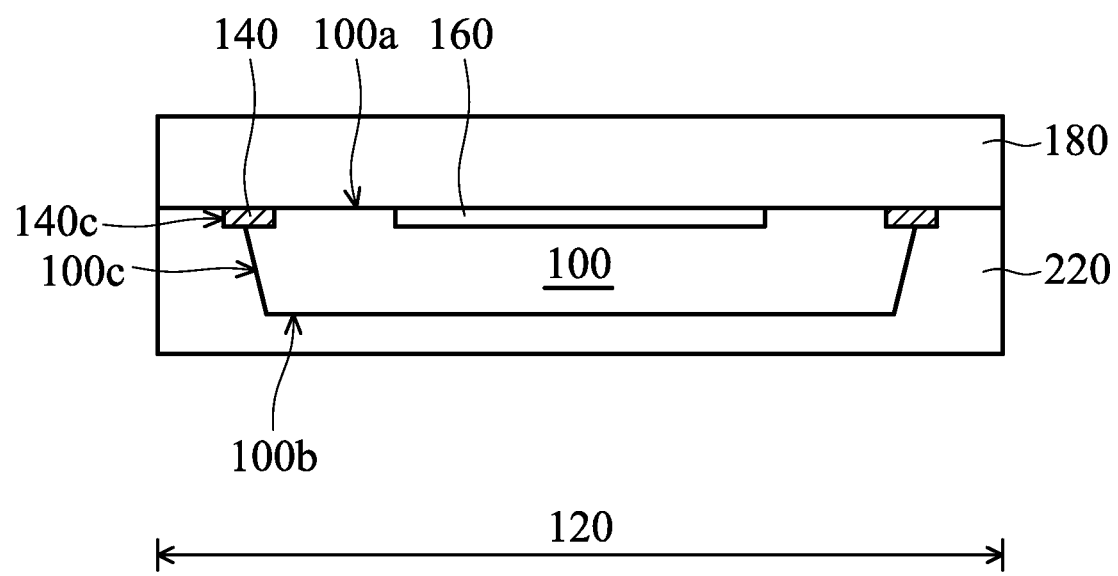
Figure 1C:
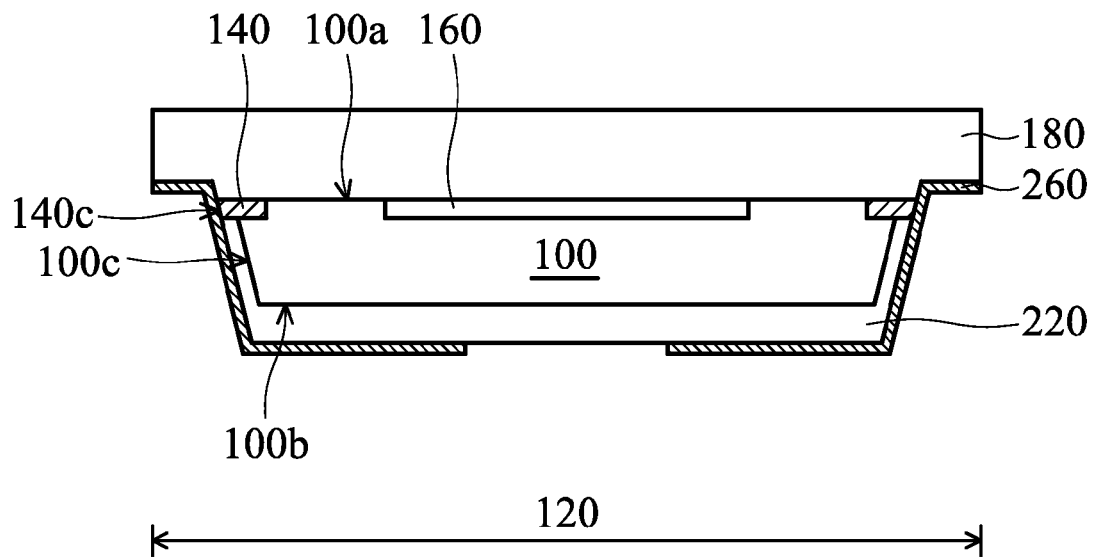
Figure 1D:
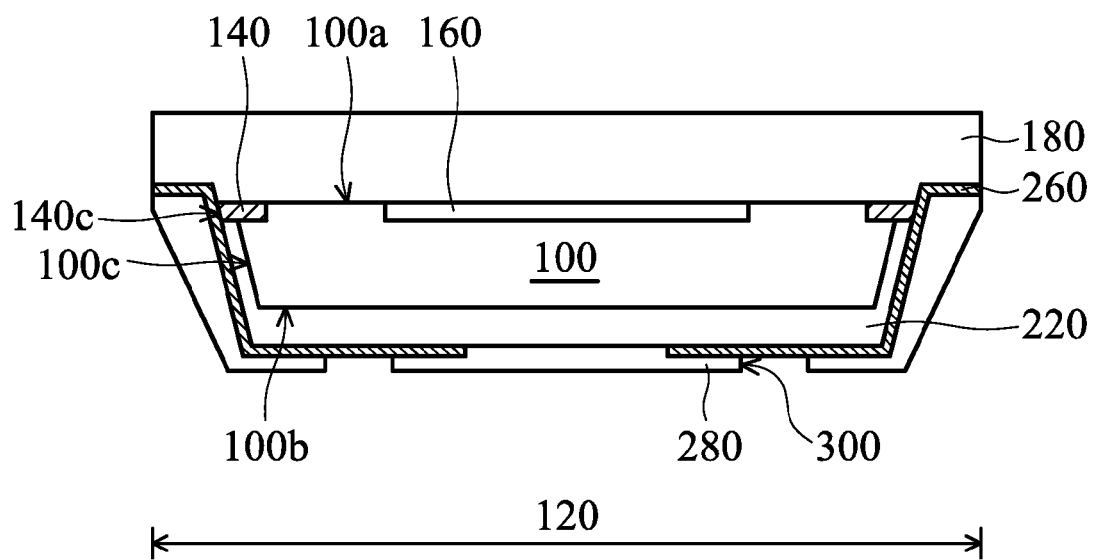
Figure 1E:
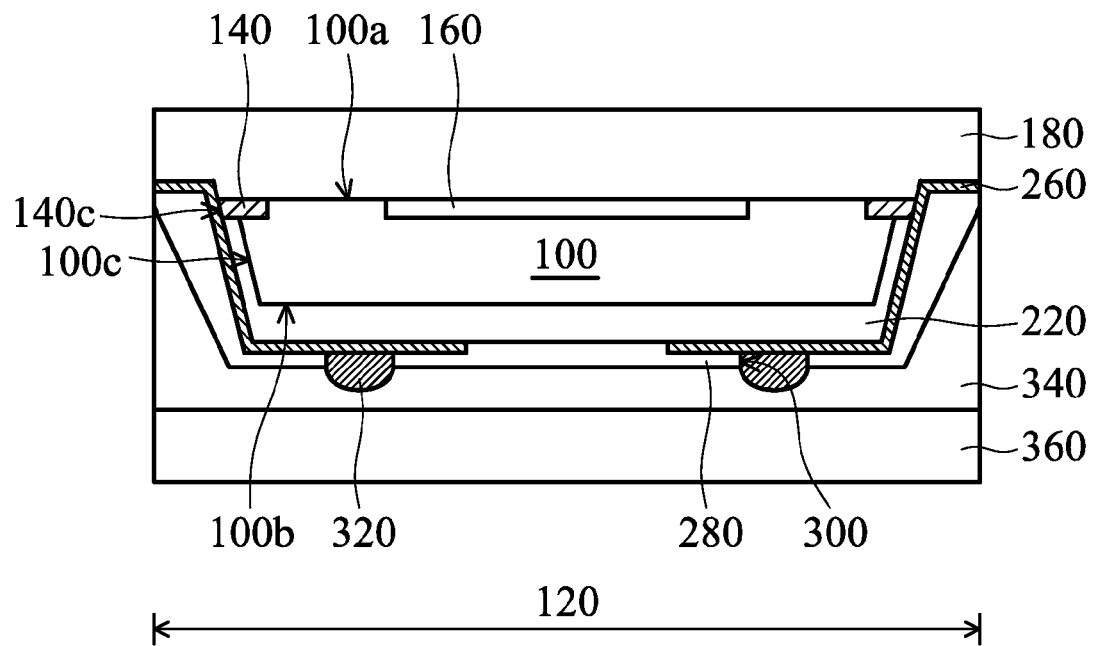
Figure 1F:
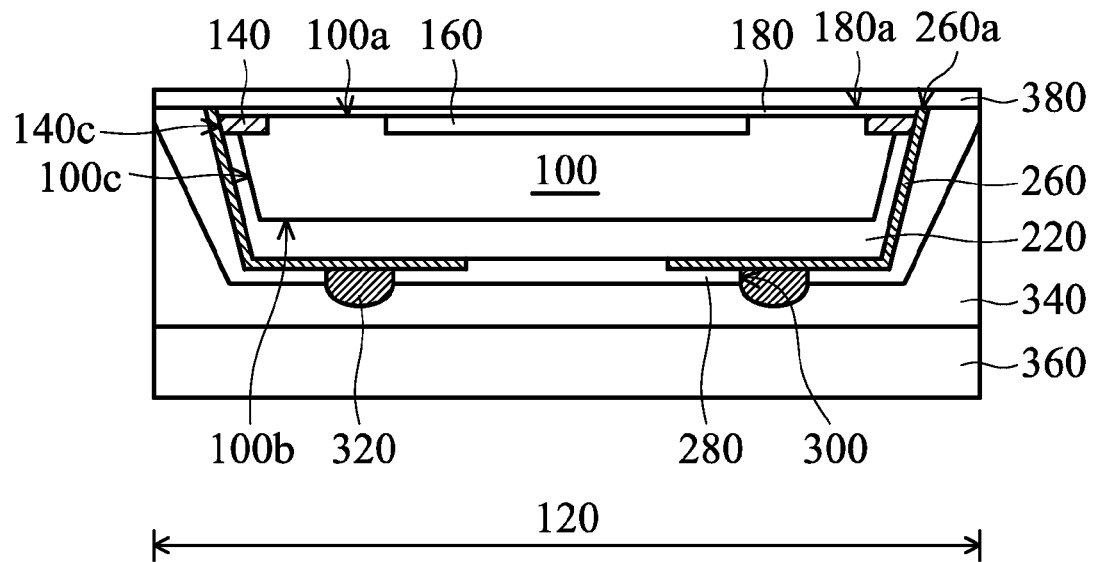
Figure 1G:
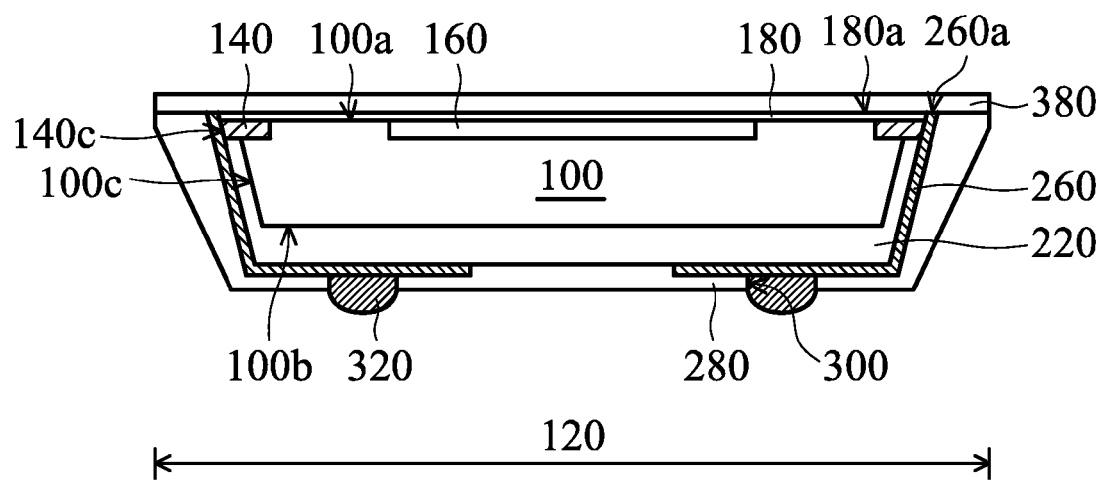

Referring to FIG. 1G, a cross-sectional view of an exemplary embodiment of a chip package according to the invention is illustrated. In the embodiment, the chip package comprises a substrate 100, an encapsulation layer 180 and a redistribution (RDL) layer 260. The substrate 100 has a first surface 100a, a second surface 100b opposite to the first surface 100a, and a sidewall 100c. In one embodiment, the substrate 100 may be a silicon substrate or another semiconductor substrate.

In the embodiment, the substrate 100 has a sensing device 160 and one or more conducting pads 140. The sensing device 160 and the conducting pads 140 may be adjacent to the first surface 100a. In one embodiment, the sensing device 160 is configured to sense biometrics, and may comprise a fingerprint-recognition element. In another embodiment, the sensing device 160 is configured to sense environmental characteristics, and may comprise a temperature-sensing element, a humidity-sensing element, a pressure-sensing element, a capacitance-sensing element, or another suitable sensing element. In one embodiment, a sensing element in the sensing device 160 may be electrically connected to the conducting pads 140 through an interconnection structure (not shown) in the substrate 100.

In the embodiment, each conducting pad 140 has a sidewall 140c laterally protruding from the sidewall 100c of the substrate 100. In one embodiment, the conducting pad 140 may be a single conducting layer or comprise multiple conducting layers. To simplify the diagram, only a single conducting layer is depicted as an example and only two conducting pads 140 within the substrate 100 are depicted herein.

The encapsulation layer 180 is attached to the first surface 100a of the substrate 100 to cover the sensing device 160 and the conducting pads 140. In the embodiment, a sidewall of the encapsulation layer 180 is aligned with the sidewall 140c of the conducting pad 140. In one embodiment, the thickness of the encapsulation layer 180 may be approximately 3 μm to 30 μm (such as 25 μm). In the embodiment, the encapsulation layer 180 may comprise epoxy resin, inorganic materials (such as silicon oxide, silicon nitride, silicon oxynitride, metal oxide or a combination thereof), organic polymer materials (such as polyimide, butylcyclobutene (BCB), parylene, polynaphthalenes, fluorocarbons or acrylates) or another suitable insulating material.

An insulating layer 220 is disposed on the second surface 100b of the substrate 100. The insulating layer 220 extends along the sidewalls 100c of the substrate 100 to cover a portion of the conducting pads 140, which laterally protrudes from the substrate 100. In the embodiment, the insulating layer 220 may comprise epoxy resin, inorganic materials (such as silicon oxide, silicon nitride, silicon oxynitride, metal oxide or a combination thereof), organic polymer materials (such as polyimide, butylcyclobutene (BCB), parylene, polynaphthalenes, fluorocarbons or acrylates) or another suitable insulating material.

The redistribution layer 260 is disposed on the insulating layer 220 on the second surface 100b of the substrate 100. The redistribution layer 260 conformally extends to the sidewalls of the encapsulation layer 180 and is in direct contact with the sidewall 140c of the conducting pad 140. Therefore, the redistribution layer 260 forms a T-contact electrically connected to the corresponding conducting pad 140, and the redistribution layer 260 is electrically isolated from the substrate 100 through the insulating layer 220. In the embodiment, an end 260a of the redistribution layer 260 protrudes from the first surface 100a of the substrate 100 and is aligned with a third surface 180a of the encapsulation layer 180, which is opposite to the first surface 100a of the substrate 100. In one embodiment, the redistribution layer 260 may comprise copper, aluminum, gold, platinum, nickel, tin, a combination thereof or another suitable conductive material. In another embodiment, the redistribution layer 260 may comprise a conductive polymer material or a conductive ceramic material (such as indium tin oxide or indium zinc oxide).

In the embodiment, the chip package further comprises a protection layer 380 disposed on the first surface 100a of the substrate 100 to cover the encapsulation layer 180 and the end 260a of the redistribution layer 260. In one embodiment, the hardness of the protection layer 380 is greater than that of the encapsulation layer 180. For example, the hardness of the protection layer 380 is greater than Mohs hardness of 7H. In another embodiment, the protection layer 380 comprises a material with high erosion-resistant. Yet another embodiment, the protection layer 380 comprises a material capable of blocking vapor. In one embodiment, the thickness of the protection layer 380 may be in a range of about 30 μm to about 40 μm.

In the embodiment, the chip package further comprises a passivation layer 280 and a plurality of conducting structures 320. The passivation layer 280 and the conducting structures 320 are disposed on the second surface 100b of the substrate 100.

The passivation layer 280 is disposed on the insulating layer 220 and the redistribution layer 260, and covers a portion of the protection layer 380. In the embodiment, the passivation layer 280 has a surface aligned with the third surface 180a of the encapsulation layer 180. The passivation layer 280 has a plurality of openings 300 to expose a corresponding portion of the redistribution layer 260, which is located on the second surface 100b of the substrate 100. In the embodiment, the passivation layer 280 may comprise epoxy resin, solder mask, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates), photoresist materials, or another suitable insulating material.

The conducting structures 320 are correspondingly disposed within the openings 300 of the passivation layer 280 to directly contact the exposed portions of the redistribution layer 260 and electrically connect to the redistribution layer 260. In the embodiment, the conducting structures 320 may be solder balls, bumps, conductive pillars, or another suitable conducting structure. The conducting structures 320 may comprise tin, lead, copper, gold, nickel, a combination thereof, or another suitable conductive material.

Figure 2:
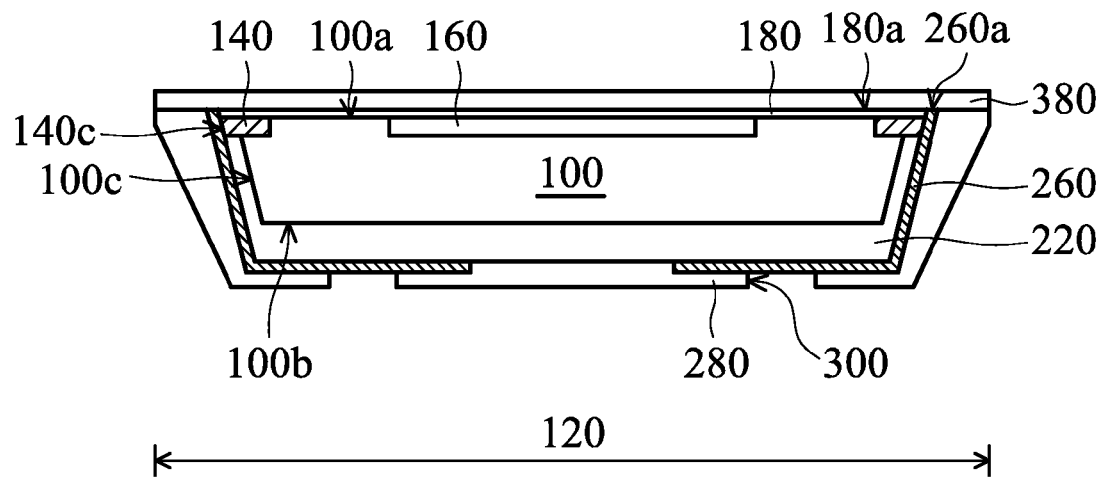
FIG. 2 is a cross-sectional view of another exemplary embodiment of a chip package according to the invention.
Figure 3A:
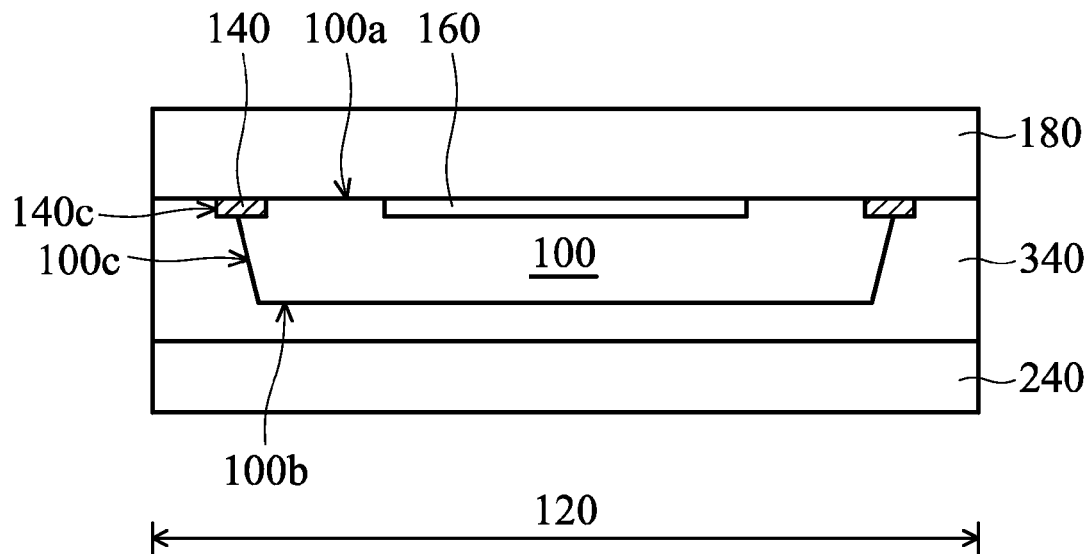
FIGS. 3A to 3D are cross-sectional views of another exemplary embodiment of a method for forming a chip package according to the invention.
Figure 3B:
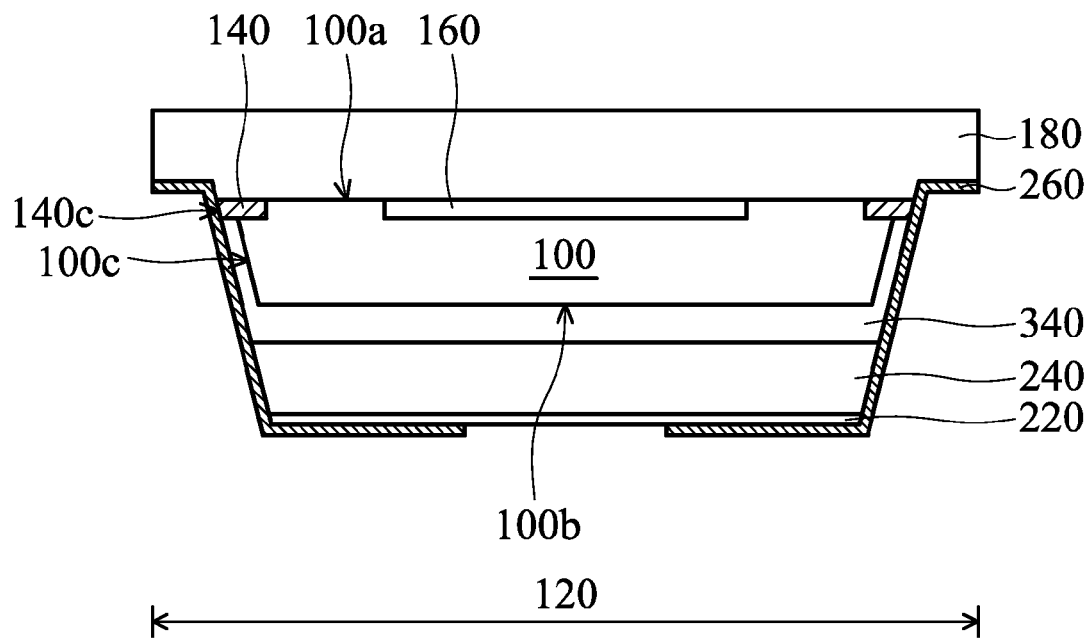
Figure 3C:
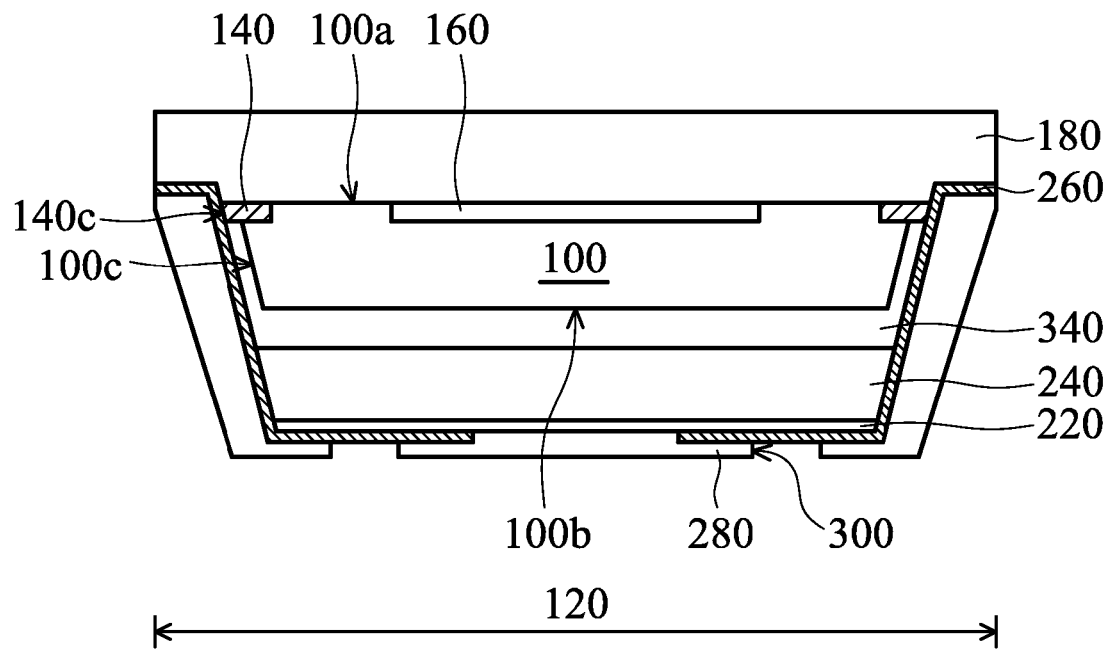
Figure 3D:
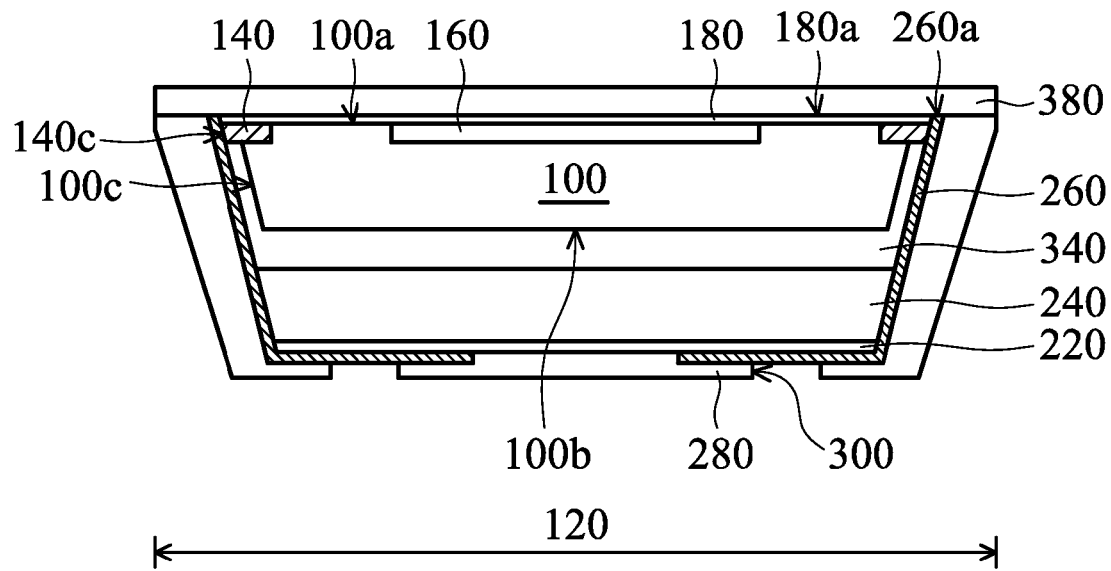

FIGS. 2 and 3D are cross-sectional views of various exemplary embodiments of a chip package according to the invention, wherein elements in FIGS. 2 and 3D that are the same as those in FIG. 1G are labeled with the same reference numbers as in FIG. 1G and are not described again for brevity. The chip package structure shown in FIG. 2 is similar to that shown in FIG. 1G. The difference therebetween is that a ball grid array (BGA) is formed of the conducting structures 320 in the openings 300 of the passivation layer 280 to serve as external conducting structures of the chip package shown in FIG. 1G. A land grid array (LGA) is formed of the redistribution layer 260 exposed by the openings 300 of the passivation layer 280 to serve as external conducting structures of the chip package shown in FIG. 2.

The chip package structure shown in FIG. 3D is similar to that shown in FIG. 2. The difference therebetween is that not only the insulating layer 220 but also a support substrate 240 and an adhesive layer 340 are disposed between the substrate 100 and the redistribution layer 260, as shown in FIG. 3D. The support substrate 240 is attached to the second surface 100b of the substrate 100 through the adhesive layer 340. In one embodiment, the support substrate 240 may comprise glass, silicon, a plastic film, sapphire, or another suitable support material.

In the embodiment, the adhesive layer 340 extends along the sidewalls 100c of the substrate 100 and covers a portion of the conducting pads 140, which laterally protrudes from the substrate 100. In one embodiment, the adhesive layer 340 may comprise adhesive glue, a tape, wax or another suitable adhesive material.

In the embodiment, the insulating layer 220 is located between the support substrate 240 and the redistribution layer 260 without extending along the sidewall 100c of the substrate 100. Furthermore, the redistribution layer 260 conformally extends along the sidewalls of the insulating layer 220, the support substrate 240, and the adhesive layer 340 onto the sidewall of the encapsulation layer 180. The redistribution layer 260 is in direct contact with the sidewall 140c of the conducting pad 140 and is electrically isolated from the substrate 100 through the adhesive layer 340.

According to the aforementioned embodiments, a T-contact, rather than wires (such as gold wires) and a lead frame, forms an external electrical connection path of the substrate having a sensing device. Therefore, the processing cost and the size of the chip package is reduced further. Furthermore, the protection layer on the sensing device of the chip package is formed of a material with high hardness, with high erosion-resistant, or capable of blocking vapor so as to protect the end of the redistribution layer, which is a portion of the T-contact, and the encapsulation layer having a relatively small thickness. This protection layer also provide a flat surface with wear-resistant, scratch proof, and high reliability above the sensing device to prevent the sensing device of the chip package from being contaminated or damaged when the sensing function of the chip package is used. Therefore, the reliability and quality of the chip package can be improved.

An exemplary embodiment of a method for forming a chip package according to the invention is illustrated with FIGS. 1A to 1G, wherein FIGS. 1A to 1G are cross-sectional views of an exemplary embodiment of a method for forming a chip package according to the invention.

Referring to FIG. 1A, a substrate 100 is provided. The substrate 100 has a first surface 100a and a second surface 100b opposite thereto. In one embodiment, the substrate 100 may be a silicon substrate or another semiconductor substrate. In another embodiment, the substrate 100 is a silicon wafer so as to facilitate the wafer-level packaging process. In the embodiment, the substrate 100 comprises a plurality of chip regions 120. To simplify the diagram, only one chip region 120 of the substrate 100 is depicted herein.

In the embodiment, the substrate 100 in each chip region 120 has a sensing device 160 and one or more conducting pads 140. The sensing device 160 and the conducting pads 140 may be adjacent to the first surface 100a. In one embodiment, the sensing device 160 is configured to sense biometrics, and may comprise a fingerprint-recognition element. In another embodiment, the sensing device 160 is configured to sense environmental characteristics, and may comprise a temperature-sensing element, a humidity-sensing element, a pressure-sensing element, a capacitance-sensing element, or another suitable sensing element. In one embodiment, a sensing element in the sensing device 160 may be electrically connected to the conducting pads 140 through an interconnection structure (not shown) in the substrate 100. In one embodiment, the conducting pad 140 may be a single conducting layer or comprise multiple conducting layers. To simplify the diagram, only a single conducting layer is depicted as an example and only two conducting pads 140 within one chip region 120 of the substrate 100 are depicted herein.

Next, an encapsulation layer 180 is attached to the first surface 100a of the substrate 100 by a molding process or a deposition process (such as a coating process, a physical vapor deposition process, a chemical vapor deposition process or another suitable process) to cover the sensing device 160 and the conducting pads 140. In the embodiment, the encapsulation layer 180 has a third surface 180a opposite to the first surface 100a of the substrate 100. In the embodiment, the encapsulation layer 180 may comprise epoxy resin, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates) or another suitable insulating material.

Referring to FIG. 1B, the encapsulation layer 180 is used as a support substrate and a thinning process (such as an etching process, a milling process, a mechanical grinding process, or a chemical mechanical polishing process) is performed on the substrate 100 so as to reduce the thickness of the substrate 100. Next, a portion of the substrate 100 is removed from the edge of the chip region 120 by lithography and etching processes (the etching process may comprise a dry etching process, a wet etching process, a plasma etching process, a reactive ion etching process or another suitable process), such that each conducting pad 140 has a sidewall 140c laterally protruding from a sidewall 100c of the substrate 100. For example, a portion of the substrate 100, which corresponds to a scribe line (not shown) between the adjacent chip regions 120, is removed to expose portions of the encapsulation layer 180 and the conducting pads 140, such that the portions of the substrate 100 in the adjacent chip regions 120 are separated from each other.

Next, an insulating layer 220 is conformally formed on the second surface 100b of the substrate 100 by a deposition process (such as a coating process, a physical vapor deposition process, a chemical vapor deposition process or another suitable process). The insulating layer 220 extends along the sidewalls 100c of the substrate 100 to cover a portion of the encapsulation layer 180 and an exposed portion of each conducting pad 140. In the embodiment, the insulating layer 220 may comprise epoxy resin, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates) or another suitable insulating material.

Referring to FIG. 1C, portions of the insulating layer 220 and the encapsulation layer 180 are removed by a notching process, an etching process or another suitable process to expose a sidewall 140c of each conducting pad 140. For example, portions of the insulating layer 220 and the encapsulation layer 180, which correspond to the scribe line (not shown) between the adjacent chip regions 120, are removed, such that the portions of the insulating layer 120 in the adjacent chip regions 120 are separated from each other.

Next, a patterned redistribution layer 260 is formed on the insulating layer 220 by a deposition process (such as a coating process, a physical vapor deposition process, a chemical vapor deposition process or another suitable process), lithography and etching processes. The redistribution layer 260 conformally extends onto the encapsulation layer 180 and is in direct contact with the sidewall 140c of the conducting pad 140. Therefore, the redistribution layer 260 forms a T-contact electrically connected to the corresponding conducting pad 140, and the redistribution layer 260 is electrically isolated from the substrate 100 through the insulating layer 220. In one embodiment, the redistribution layer 260 may comprise copper, aluminum, gold, platinum, nickel, tin, a combination thereof or another suitable conductive material. In another embodiment, the redistribution layer 260 may comprise a conductive polymer material or a conductive ceramic material (such as indium tin oxide or indium zinc oxide).

Referring to FIG. 1D, a passivation layer 280 is conformally formed on the insulating layer 220 and the redistribution layer 260 by a deposition process (such as a coating process, a physical vapor deposition process, a chemical vapor deposition process or another suitable process) to cover the redistribution layer 260. Subsequently, a plurality of openings 300 is formed inside of the passivation layer 280 in each chip region 120 by lithography and etching processes so as to expose portions of the redistribution layer 260 located on the second surface 100b of the substrate 100. In the embodiment, the passivation layer 280 may comprise epoxy resin, solder mask, inorganic materials (such as silicon oxide, silicon nitride, silicon oxynitride, metal oxide or a combination thereof), organic polymer materials (such as polyimide, butylcyclobutene, parylene, polynaphthalenes, fluorocarbons or acrylates), or another suitable insulating material. In another embodiment, the passivation layer 280 may comprise a photoresist material, and the openings 300 may be formed in the passivation layer 280 by exposure and developing processes.

Referring to FIG. 1E, a conducting structure 320 is formed in each opening 300 of the passivation layer 280. The conducting structures 320 directly contact the exposed portions of the redistribution layer 260 and electrically connect to the patterned redistribution layer 260. For example, solder may be formed in the openings 300 of the passivation layer 280 by a plating process, a screen printing process or another suitable process, and then a reflow process is performed to form the conducting structures 320, which are referred to as a ball grid array (BGA). In the embodiment, the conductive structure 320 may comprise tin, lead, copper, gold, nickel, a combination thereof, or another suitable conductive material.

In other embodiments, the ball grid array may be replaced by a land grid array (LGA), as shown in FIG. 2. In the embodiment of FIG. 2, there is no conducting structure formed in the openings 300 of the passivation layer 280, and the redistribution layer 260 is exposed. In the subsequent process, before an independent chip package is bonded to a circuit board, solder (such as a solder paste and a flux) is formed on the circuit board by surface mount technology (SMT) and then a reflow process is performed to form conducting structures corresponding to the openings 300 of the passivation layer 280. Next, the chip package is bonded to the circuit board, and the redistribution layer 260 in the chip package is electrically connected to the circuit board through these conducting structures.

Compared to forming the conducting structures 320 in the openings 300 of the passivation layer 280, forming the conducting structures corresponding to the openings 300 of the passivation layer 280 on the circuit board can reduce the amount of solder (such as the amount of the solder paste), thereby effectively reducing the processing cost. Furthermore, the height of the conducting structures formed on the circuit board is less than the height of the conducting structures 320. Accordingly, the overall size of the chip package and the circuit board is reduced. Subsequently, a temporary substrate 360 is bonded to the second surface 100b of the substrate 100 through an adhesive layer 340 to provide a flat surface and protect the conducting structures 320. In one embodiment, the adhesive layer 340 may comprise adhesive glue, a tape, wax or another suitable adhesive material. In one embodiment, the temporary substrate 360 may be a glass substrate, a silicon substrate, or another suitable substrate.

Referring to FIG. 1F, the temporary substrate 360 is used as a support structure and a grinding process (such as a mechanical grinding process) is performed on the encapsulation layer 180 so as to reduce the thickness of the encapsulation layer 180. For example, the encapsulation layer 180 may be ground until portions of the redistribution layer 260, which laterally extend on the passivation layer 280, are exposed, such that the portions of the encapsulation layer 180 in the adjacent chip regions 120 are separated from each other.

In the embodiment, the aforementioned grinding process further comprises removing the portions of the redistribution layer 260, which laterally extend on the passivation layer 280, to expose the passivation layer 280. As a result, the redistribution layer 260 has an end 260a protruding from the first surface 100a of the substrate 100, and the end 260a is aligned with the third surface 180a of the encapsulation layer 180. Moreover, the sidewall of the ground encapsulation layer 180 is aligned with the sidewall 140c of the conducting pad 140. A surface of the passivation layer 280 is aligned with the third surface 180a of the encapsulation layer 180. In one embodiment, the thickness of the ground encapsulation layer 180 may be approximately 3 nm to 30 nm (such as 25 nm).

Next, a protection layer 380 is formed on the third surface 180a of the encapsulation layer 180 by a deposition process (such as a coating process, a physical vapor deposition process, a chemical vapor deposition process or another suitable process) to cover the ground encapsulation layer 180 and the end 260a of the redistribution layer 260. In one embodiment, the hardness of the protection layer 380 is greater than that of the encapsulation layer 180. In another embodiment, the protection layer 380 comprises a material with high erosion-resistant. Yet another embodiment, the protection layer 380 comprises a material capable of blocking vapor. In one embodiment, the thickness of the protection layer 380 may be in a range of about 30 μm to about 40 μm.

Referring to FIG. 1G, after the adhesive layer 340 and the temporary substrate 360 are removed, the passivation layer 280 and the protection layer 380 are diced along the scribe line (not shown) between the adjacent chip regions 120 so as to form a plurality of independent chip packages.

According to the aforementioned embodiments, the encapsulation layer and the redistribution layer are ground until the portions of the encapsulation layer in the adjacent chip regions are separated from each other, and the portions of the redistribution layer laterally extending on the encapsulation/passivation layer are removed simultaneously. As a result, the thickness of the encapsulation layer can be as small as possible, thereby increasing the sensitivity of the sensing device under the encapsulation layer. Furthermore, forming the protection layer with high hardness and high erosion-resistant and capable of blocking vapor on the thinned encapsulation layer can protect the thinned encapsulation layer and the ends of the redistribution layer, which are exposed after the grinding process. This protection layer also provide a flat surface with wear-resistant, scratch proof, and high reliability on the sensing side of the chip package to prevent the sensing device from being contaminated or damaged when the sensing function of the chip package is used. Therefore, the reliability and quality of the chip package can be improved.

In addition, forming chip packages by the wafer-level packaging process can produce massive chip packages, thereby reducing the processing cost and time. Moreover, the encapsulation layer not only protects the underlying sensing device, but also serves as a carrier substrate providing support during the wafer-level packaging process.

FIGS. 3A to 3D are cross-sectional views of another exemplary embodiment of a method for forming a chip package according to the invention, wherein elements in FIGS. 3A to 3D that are the same as those in FIGS. 1A to 1G are labeled with the same reference numbers as in FIGS. 1A to 1G, and are not described again for brevity.

Referring to FIG. 3A, a substrate 100 and an encapsulation layer 180 as shown in FIG. 1A are provided. The substrate 100 is then thinned by a method similar to that shown in FIG. 1B and a portion of the substrate 100 is removed from the edge of the chip region 120 by lithography and etching processes, such that each conducting pad 140 has a sidewall 140c laterally protruding from a sidewall 100c of the substrate 100.

Subsequently, a support substrate 240 is attached to the second surface 100b of the substrate 100 through an adhesive layer 340. In one embodiment, the support substrate 240 may comprise glass, silicon, a plastic film, sapphire, or another suitable support material. In the embodiment, the adhesive layer 340 extends along the sidewall 100c of the substrate 100 to cover a portion of the conducting pads 140, which laterally protrudes from the substrate 100. In one embodiment, the adhesive layer 340 may comprise adhesive glue, a tape, wax or another suitable adhesive material.

Referring to FIG. 3B, an insulating layer 220 is formed on the support substrate 240 by a method similar to that shown in FIG. 1C. Next, portions of the insulating layer 220, the support substrate 240, the adhesive layer 340 and the encapsulation layer 180 are removed by a notching process or another suitable process, and a sidewall 140c of each conducting pad 140 is exposed. For example, portions of the insulating layer 220, the support substrate 240, the adhesive layer 340 and the encapsulation layer 180, which correspond to the scribe line (not shown) between the adjacent chip regions 120, are removed. As a result, the portions of the insulating layer 220, the support substrate 240 and the adhesive layer 340 in the adjacent chip regions 120 are separated from each other.

Next, a patterned redistribution layer 260 is formed on the insulating layer 220 by a method similar to that shown in FIG. 1C. The redistribution layer 260 conformally extends along the sidewalls of the insulating layer 220, the support substrate 240 and the adhesive layer 340 onto the encapsulation layer 180. The redistribution layer 260 is in direct contact with the sidewall 140c of the conducting pad 140. Therefore, the redistribution layer 260 forms T-contacts electrically connected to the corresponding conducting pads 140 and the redistribution layer 260 is electrically isolated from the substrate 100 through the adhesive layer 340.

Referring to FIG. 3C, a passivation layer 280 is conformally formed on the insulating layer 220 and the redistribution layer 260 by a method similar to that shown in FIG. 1D. The passivation layer 280 covers the redistribution layer 260. A plurality of openings 300 is formed inside of the passivation layer 280 in each chip region 120 by a method similar to that shown in FIG. 1D. Portions of the redistribution layer 260 located on the second surface 100b of the substrate 100 are exposed by the openings 300.

Referring to FIG. 3D, a grinding process is performed on the encapsulation layer 180 using a temporary substrate (not shown) as a support structure, and the portions of the redistribution layer 260 laterally extending on the passivation layer 280 are simultaneously removed by a method similar to that shown in FIGS. 1E to 1G. As a result, the passivation layer 280 is exposed, and ends 260a of the redistribution layer 260 protrude from the first surface 100a of substrate 100 and are aligned with the third surface 180a of the encapsulation layer 180. Moreover, the sidewall of the ground encapsulation layer 180 is aligned with the sidewall 140c of the conducting pad 140. A surface of the passivation layer 280 is aligned with the third surface 180a of the encapsulation layer 180. In one embodiment, the thickness of the ground encapsulation layer 180 may be approximately 3 μm to 30 μm (such as 25 μm).

Next, a protection layer 380 is formed on the third surface 180a of the encapsulation layer 180 by a deposition process to cover the ground encapsulation layer 180 and the ends 260a of the redistribution layer 260. Subsequently, after the temporary substrate (not shown) is removed, the passivation layer 280 and the protection layer 380 are diced along the scribe line (not shown) between the adjacent chip regions 120 so as to form a plurality of independent chip packages.

In this embodiment, a land grid array (LGA) serves as external conducting structures of the chip package. However, in other embodiments, the land grid array may be replaced by a ball grid array (BGA).

According to the aforementioned embodiments, a permanent support substrate 240 is provided on a side of the substrate 100 opposite to protection layer 380 (i.e., the side opposite to the sensing side of the chip package). The structural strength of the chip package is increased. As a result, layers in the chip package can be prevented from deformation due to lack of support when the sensing function of the chip package is used. Therefore, the reliability and quality of chip package can be improved. While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chip package, comprising:
   a substrate having a first surface and a second surface opposite thereto, wherein the substrate comprises a sensing device and at least one conducting pad therein, and the sensing device and the at least one conducting pad are adjacent to the first surface, and wherein the at least one conducting pad has a sidewall laterally protruding from a sidewall of the substrate;
   an encapsulation layer attached to the first surface of the substrate to cover the sensing device and the at least one conducting pad; and
   a redistribution layer disposed on the second surface of the substrate and extending to contact the sidewall of the at least one conducting pad, wherein an end of the redistribution layer protrudes from the first surface of the substrate and is aligned with a third surface of the encapsulation layer that is opposite to the first surface of the substrate.

2. The chip package as claimed in claim 1, wherein a sidewall of the encapsulation layer is aligned with the sidewall of the at least one conducting pad.

3. The chip package as claimed in claim 1, further comprising a protection layer covering the encapsulation layer and the end of the redistribution layer.

4. The chip package as claimed in claim 3, wherein a hardness of the protection layer is greater than that of the encapsulation layer.

5. The chip package as claimed in claim 1, further comprising an insulating layer disposed between the second surface of the substrate and the redistribution layer.

6. The chip package as claimed in claim 5, wherein the insulating layer covers the sidewall of the substrate.

7. The chip package as claimed in claim 1, further comprising a passivation layer disposed on the redistribution layer.

8. The chip package as claimed in claim 7, wherein a surface of the passivation layer is aligned with the third surface of the encapsulation layer.

9. The chip package as claimed in claim 7, wherein the passivation has an opening exposing a portion of the redistribution layer on the second surface of the substrate.

10. The chip package as claimed in claim 9, further comprising a conducting structure disposed on the exposed portion of the redistribution layer.

11. The chip package as claimed in claim 1, further comprising a support substrate disposed between the second surface of the substrate and the redistribution layer.

12. The chip package as claimed in claim 11, further comprising an adhesive layer disposed between the second surface of the substrate and the support substrate, wherein the adhesive layer extends between the sidewall of the substrate and the redistribution layer.

13. A method for forming a chip package, comprising:
providing a substrate having a first surface and a second surface opposite thereto, wherein the substrate comprises a sensing device and at least one conducting pad therein, and the sensing device and the at least one conducting pad are adjacent to the first surface, and wherein the at least one conducting pad has a sidewall laterally protruding from a sidewall of the substrate;
attaching an encapsulation layer to the first surface of the substrate to cover the sensing device and the at least one conducting pad; and
forming a redistribution layer on the second surface of the substrate, wherein the redistribution layer extends to contact the sidewall of the at least one conducting pad, and wherein an end of the redistribution layer protrudes from the first surface of the substrate and is aligned with a third surface of the encapsulation layer that is opposite to the first surface of the substrate.

14. The method as claimed in claim 13, wherein a sidewall of the encapsulation layer is aligned with the sidewall of the at least one conducting pad.

15. The method as claimed in claim 13, further comprising forming a protection layer to cover the encapsulation layer and the end of the redistribution layer.

16. The method as claimed in claim 15, wherein a hardness of the protection layer is greater than that of the encapsulation layer.

17. The method as claimed in claim 13, further comprising forming an insulating layer between the second surface of the substrate and the redistribution layer.

18. The method as claimed in claim 17, wherein the insulating layer covers the sidewall of the substrate.

19. The method as claimed in claim 13, further comprising forming a passivation layer on the redistribution layer.

20. The method as claimed in claim 19, wherein a surface of the passivation layer is aligned with the third surface of the encapsulation layer.

21. The method as claimed in claim 19, further comprising forming an opening in the passivation to expose a portion of the redistribution layer on the second surface of the substrate.

22. The method as claimed in claim 21, further comprising forming a conducting structure on the exposed portion of the redistribution layer.

23. The method as claimed in claim 13, further comprising providing a support substrate between the second surface of the substrate and the redistribution layer.

24. The method as claimed in claim 23, wherein the support substrate is attached to the second surface of the substrate by an adhesive layer, and wherein the adhesive layer extends between the sidewall of the substrate and the redistribution layer.

* * * * *